Patented Feb. 24, 1948

2,436,739

UNITED STATES PATENT OFFICE 2,436,739

METHOD OF MAKING 3,6-BIS-(BETA-HYDROXY-ETHYL)-2,5-DIKETOPIPERAZINE

Edgar C. Britton, Midland, Mich., and John E. Livak, Clemson, S. C., assignors to The Dow Chemical Company, Midland, Mich., a corporation of Delaware No Drawing. Application November 7, 1946, Serial No. 708,463

4 Claims. (Cl. 260—267)

This invention concerns an improved method of making 3,6-bis-(beta-hydroxy-ethyl)-2,5-diketopiperazine. It pertains especially to a method whereby said compound may be produced readily and economically from an alpha-halo-gamma-butyrolactone.

It may be mentioned that the alpha-halo-gamma-butyrolactones used as starting materials are new chemical compounds. They may be prepared by the reaction of chlorine or bromine with gamma-butyrolactone, followed by heating of the resultant alpha-gamma-dihalo-butyric acid to a temperature at which hydrogen halide is evolved. The preparation of alpha-halo-gamma-butyrolactones is described in detail in a copending application of E. C. Britton et al., Serial No. 708,462, filed concurrently herewith.

Fischer et al., vol. 40, 112 (1909) discloses that 3,6-bis-(beta-hydroxy-ethyl)-2,5-diketopiperazine is formed gradually and in low yield upon permitting alpha-amino-butyrolactone to stand at room temperature for a period of from 4 to 5 days. Snyder et al., J. A. C. S. 64, 2082 (1942), have prepared 3,6-bis-(beta-hydroxy-ethyl)-2,5-diketopiperazine in from 55 to 60 per cent yield by heating alpha-amino-butyrolactone under reflux for a period of 24 hours. The 3,6-bis-(beta - hydroxy - ethyl) - 2,5-diketopiperazine product is useful as an intermediate for the preparation of methionine, e. g., by a method also disclosed in the Snyder et al. article just mentioned. However, the long periods of reaction to produce 3,6-bis-(beta-hydroxy-ethyl)-2,5-diketopiperazine and the low yields of the latter by the known methods of preparation just mentioned have rendered use of this intermediate in the production of methionine commercially unfeasible It is an object of this invention to provide an improved method of making 3,6-bis-(beta-hydroxy-ethyl)-2,5-diketopiperazine, whereby the latter may be produced more rapidly and in higher yield than by the known methods just mentioned. Other objects will be apparent from the following description of the invention.

According to this invention, an alpha-halo-gamma-butyrolactone, e. g., alpha-chloro- or preferably alpha-bromo-gamma-butyrolactone, is reacted with an aqueous ammonium hydroxide solution to form a solution of alpha-amino-gamma-butyrolactone, together with the ammonium halide resulting from the reaction. The ammonium halide interferes seriously with subsequent use of the alpha-amino-gamma-butyrolactone as an agent for the production of 3,6-bis-(beta - hydroxy - ethyl)-2,5-diketopiperazine, and, since alpha-amino-gamma-butyrolactone is itself a syrupy, or at best, only a semi-crystalline substance, separation of the ammonium halide therefrom by usual crystallization procedures is difficult.

We have found that the impure alpha-amino-gamma-butyrolactone may readily be purified by adding potassium hydroxide to the crude ammonolysis mixture, heating the mixture to distill off excess ammonia, evaporating the mixture nearly to dryness and extracting the alpha-amino-gamma-butyrolactone from the residue with alcohol, or aqueous alcohol. The resultant solution is then treated with a hydrogen halide so as to reduce the solubility of the potassium halide therein and cause crystallization of the potassium halide. The latter is separated, e. g., by filtration, and the liquor is concentrated by evaporation to obtain the alpha-amino-gamma-butyrolactone and its hydrohalide in the form of a thick syrup.

Hydrogen bromide, or a concentrated hydrobromic acid solution, is added to the syrup so as to form a hydrobromide of the alpha-amino-gamma-butyrolactone, and the hydrobromide is crystallized from the mixture. The hydrobromide of alpha-amino-gamma-butyrolactone is thus obtained in a substantially pure crystalline form well adapted to use in preparation of the 3,6-bis-(beta-hydroxy-ethyl) - 2,5 - diketopiperazine product.

The alpha-amino-gamma-butyrolactone hydrobromide can be heated alone to decompose the same with formation of 3,6-bis-(beta-hydroxy-ethyl)-2,5-diketopiperazine in an impure form and in low yield. We have found that such decomposition can be accomplished more readily to produce the product in good yield by admixing the alpha-amino-gamma-butyrolactone hydrobromide with a solution of potassium acetate in a non-aqueous ionizing medium such as ethyl alcohol, propyl alcohol, butyl alcohol, or dioxane, etc., and heating the resultant mixture at atmospheric or superatmospheric pressure to temperatures in the order of from 50° to 150° C. or higher. After completing the reaction, the mixture may be filtered while warm to remove the insoluble potassium bromide which is formed, and the filtrate may be concentrated by evaporation and cooled to crystallize the 3,6-bis-(beta-hydroxy-ethyl)-2,5-diketopiperazine product.

The following examples illustrate certain ways in which the principle of the invention has been applied, but are not to be construed as limiting its scope.

*Example 1*

Two hundred sixteen cubic centimeters of an aqueous ammonium hydroxide solution of 32 per cent concentration was cooled in an ice bath, and 115.5 grams of alpha-bromo-gamma-butyrolactone was added with stirring. The mixture was permitted to warm to room temperature and stand for a period of 2 days. Upon admixing the alpha-bromo-gamma-butyrolactone with the ammonium hydroxide solution, the mixture turned red, but after standing for 2 days, the solution was faintly yellow. An aliquot portion of the mixture was analyzed to determine its content of bromide ions. From the analysis, it was calculated that 90.8 per cent of the alpha-bromo-gamma-butyrolactone had been reacted. To the crude ammonolysis mixture there was added 700 cubic centimeters of a 1 normal aqueous potassium hydroxide solution. The mixture was heated to distill unreacted ammonia therefrom, and, after evolution of the ammonia, heating was continued under vacuum to obtain 144 grams of a semi-solid gel as the residual product. The residue thus obtained comprised alpha-amino-gamma-hydroxy-butyric acid and potassium bromide. It was admixed with 630 cubic centimeters of ethyl alcohol, 70 cubic centimeters of water, and 92 grams of an aqueous hydrobromic acid solution of 53 per cent concentration, and the resultant mixture was heated on a steam bath until the semi-solid gel was no longer visible, but instead a finely divided precipitate of potassium bromide was obtained. The mixture was then filtered to remove potassium bromide. There was obtained 33.1 grams of the latter. The filtrate was cooled to room temperature and again filtered, whereby 19.7 grams of additional potassium bromide was obtained as residue. The filtrate was distilled first at atmospheric pressure to remove the alcohol, and then under vacuum substantially to dryness. The residue, which weighed 130 grams, was dissolved by heating the same together with 500 cubic centimeters of methyl alcohol. On cooling the solution and filtering, a further 15.2 gram portion of potassium bromide was obtained as residue. The filtrate was evaporated until of 270 cubic centimeters volume, cooled, and again filtered. A further 3.2 gram portion of potassium bromide was obtained as residue. The last-mentioned filtrate was evaporated under vacuum to obtain a viscous syrup of alpha-amino-gamma-butyrolactone. The syrup was treated with 135 cubic centimeters of an aqueous hydrobromic acid solution of 53 per cent concentration. The mixture was heated on a steam bath for 10 minutes, after which the solution was evaporated to dryness under vacuum. The crystalline residue was purified by digestion with 200 cubic centimeters of absolute ethyl alcohol. There was obtained 59 grams of alpha-amino-gamma-butyrolactone hydrobromide as a white crystalline material melting at 215°–218° C. The alcoholic extract was treated with hydrogen bromide, after which an additional 8.6 grams of the product melting at 218°–220° C. was crystallized therefrom. The yield of alpha-amino-gamma-butyrolactone hydrobromide was 62.4 per cent of theoretical, based on the alpha-bromo-gamma-butyrolactone starting material.

*Example 2*

A solution of 9.8 grams of potassium acetate and 150 cubic centimeters of absolute ethyl alcohol was warmed to 50° C., and 23 grams of alpha-amino-gamma-butyrolactone hydrobromide of 76.5 per cent purity was added. The mixture was stirred and heated to 75° C. for about 10 minutes. The mixture was then cooled to 50° C. and filtered to obtain 14.9 grams of potassium bromide as residue. The filtrate was heated under reflux on a steam bath for 4 hours, after which it was cooled to 10° C. to crystallize the 3,6-bis-(beta-hydroxy-ethyl)-2,5-diketopiperazine product. The latter was removed by filtration. There was obtained 5.2 grams of the product in the form of white crystals melting at 188°–189° C. The mother liquor from the crystallization was further evaporated and cooled, whereby an additional 1.6 grams of 3,6-bis-(beta-hydroxy-ethyl)-2,5-diketopiperazine was obtained as crystals melting at 187°–189° C. The yield of 3,6-bis-(beta-hydroxy-ethyl)-2,5-diketopiperazine was 73.3 per cent of theoretical, based on the amount of alpha-amino-gamma-butyrolactone hydrobromide employed.

A series of tests similar to that of Example 2 were carried out, except that other substances were employed in place of the potassium acetate to determine their effectiveness as catalysts for the reaction. The substances tested in the respective experiments were sodium acetate, potassium formate, ammonium acetate, sodium methylate, acetic acid, diethanolamine, and ammonia. In all of these instances, the yield of 3,6-bis-(beta-hydroxy-ethyl)-2,5-diketopiperazine was far lower than that obtained in the experiment of Example 2, wherein potassium acetate was used as the catalyst.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. A method of making 3,6-bis-(beta-hydroxy-ethyl)-2,5-diketopiperazine which comprises reacting aqueous ammonia with an alpha-halo-gamma-butyrolactone to form an alpha-amino-gamma-butyrolactone solution, treating the solution with at least 1 molecular equivalent of potassium hydroxide per mole of the alpha-amino-butyrolactone, heating the solution to vaporize unreacted ammonia therefrom, evaporating the residual product substantially to dryness, dissolving the residue in an alcoholic medium, adding hydrogen bromide in amount sufficient to convert the alpha-amino-gamma-butyrolactone to the hydrobromide thereof, crystallizing and removing potassium bromide from the resultant solution, and thereafter crystallizing alpha-amino-gamma-butyrolactone hydrobromide from the solution, heating the alpha-amino-gamma-butyrolactone hydrobromide together with a solution of potassium acetate in a non-aqueous ionizing medium to form 3,6-bis-(beta-hydroxy-ethyl)-2,5-diketopiperazine, and crystallizing the latter from the mixture.

2. In a method for the production of 3,6-bis-(beta-hydroxy-ethyl)-2,5 - diketopiperazine, the steps of reacting alpha-bromo-gamma-butyrolactone with an aqueous ammonia solution to form a solution of alpha-amino-gamma-butyrolactone, treating the solution with potassium hydroxide in amount at least as great as the molecular equivalent of the alpha-amino-gamma-butyrolactone, distilling unreacted ammonia from the solution, evaporating the solution substantially to dryness, dissolving the residual alpha-amino-gamma-butyrolactone in aqueous alcohol, adding sufficient hydrobromic acid to neutralize the potassium hydroxide and convert the alpha-amino-gamma-butyrolactone to its hydrobromide, and successively crystallizing and removing from the mixture potassium bromide and the alpha-amino-gamma-butyrolactone hydrobromide.

3. In a method for the production of 3,6-bis-(beta-hydroxy-ethyl)-2,5 - diketopiperazine, the step of heating an alpha-amino-gamma-butyrolactone hydrohalide together with a minor amount of potassium acetate to a reaction temperature between 50° and 150° C.

4. In a method for the production of 3,6-bis-(beta-hydroxy-ethyl)-2,5 - diketopiperazine, the steps which consist in heating alpha-amino-gamma-butyrolactone hydrobromide and a minor amount of potassium acetate in an alcoholic medium to a reaction temperature between 50° and 150° C., and crystallizing from the resultant mixture the 3,6-bis-(beta-hydroxy-ethyl)-2,5-diketopiperazine product.

EDGAR C. BRITTON.
JOHN E. LIVAK.